UNITED STATES PATENT OFFICE.

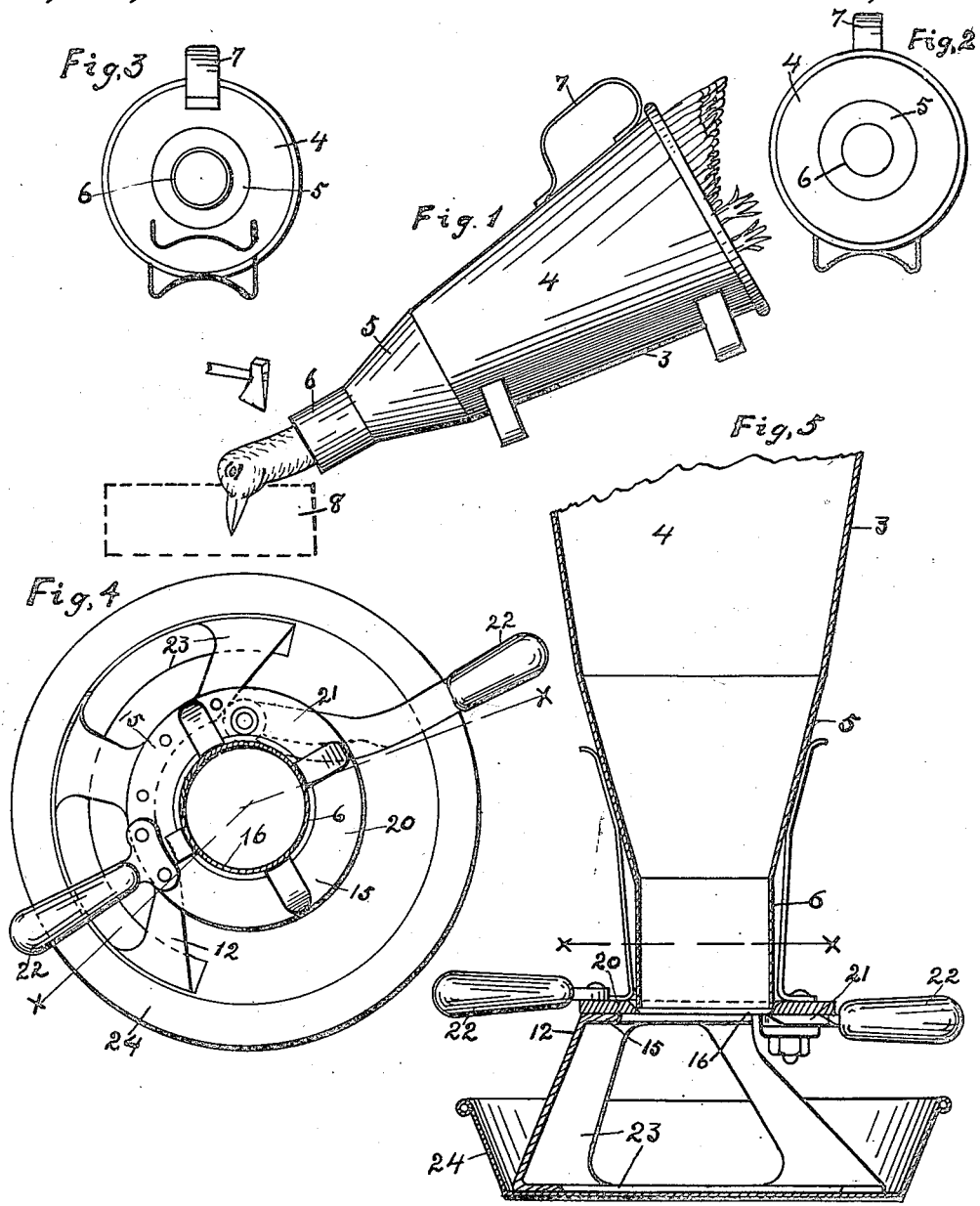

CHARLES J. BAKER, OF KEARNEY, NEW JERSEY.

FOWL RETAINER OR HOLDER.

1,410,640.  Specification of Letters Patent.  Patented Mar. 28, 1922.

Application filed December 13, 1921. Serial No. 522,175.

*To all whom it may concern:*

Be it known that I, CHARLES J. BAKER, citizen of the United States, and resident of Soldiers Home—Kearney, in the county of Hudson and State of New Jersey, have invented certain new and useful Improved Fowl Retainers or Holders, of which the following is a specification.

My invention relates to fowl retainers or holders, and the object is to produce a retainer of this class which is so constructed that a fowl can be easily placed therein, for transportation and decapitation or beheading, without injury or suffering to the said fowl.

Referring to the drawings, Figure 1 is a side view of my improved retainer.

Fig. 2 is a top end view of same.

Fig. 3 is a bottom end view of same.

Fig. 4 is another top view of the retainer showing the beheading or decapitating shears attached and the dripping vessel associated therewith.

Fig. 5 is a vertical sectional view on line X X, Fig. 4.

Heretofore fowls were caught, and carried to the beheading block. The head of the fowl then laid on the block and severed by an axe or cleaver, then the body thrown on the ground. In the death-struggle of the fowl the body will flop about in the dust and dirt, bruising the flesh, and soiling the feathers with blood, and in some cases getting lost in the bushes, &c. This method of handling fowls for beheading is very unsanitary.

My invention is adapted to overcome these objections, and it simply consists of a funnel shaped retainer, 3 comprising funnel upper large portion, 4 integral small funnel end 5 and integral tubular outer end portion 6, all of which are made of any suitable metal. The portion 4 is provided with a handle 7.

The fowl is caught and its body inserted in the funnel portion 4 which does not cause suffering to the same. The neck of the fowl is drawn or allowed to pass through the tubular end 6 and extend beyond same for freely beheading—the thick neck portion, close to the body, fitting, the small funnel portion 5 of retainer.

Now the fowl is comfortably resting in the retainer, and can be easily carried about by the handle 7 to any place or for beheading. In beheading the fowl's head is laid on block 8 dotted lines and the head cut off by an axe or cleaver, or a knife, outdoors or indoors—after the head has been severed the retainer by handle 7 can be held up and the blood allowed to drain out in a vessel located close by.

In some cases the beheading may be done by the machine 12 made to fit and hold over the outside of the retainer consisting of the cylindrical base 15 with central hold 16 for the fowl's head to pass through. The base supports the stationary curved shear or blade 20 and the movable curved shear or blade 21 pivoted on base, 22 are the knife operating handles. Now by placing this machine over retainer as shown in Fig. 5 and allowing the fowl's head to extend below the knives, the fowl can be quickly beheaded by bringing the blades together by their handles.

The base is provided with a stand formation 23 to permit the beheader to be set in the dripping vessel 24.

I do not confine myself to this mode of a decapitating machine as my invention principle consists of a fowl holder or retainer for transportation or beheading, and

What I claim is—

1. In a fowl decapitating retainer comprising the funnel shaped body portion, the integral funnel neck portion and the integral head portion, said retainer provided with a handle.

2. In a fowl retainer and carrier comprising the funnel body portion, funnel neck-head portion and the tubular head portion, all integrally formed out of the same metal, and means for carrying the retainer consisting of a handle.

3. In a fowl beheading holder, the retainer comprising funnel body portion integral body-neck portion and integral head tubular portion, means for carrying retainer consisting of a handle, and means for beheading the fowl.

Signed at Soldiers Home—Kearney, in the county of Hudson and State of New Jersey, this 26th day of October, A. D. 1921.

CHARLES J. BAKER.